(12) United States Patent
Chung et al.

(10) Patent No.: US 11,018,598 B2
(45) Date of Patent: May 25, 2021

(54) SYSTEM AND METHOD FOR CONTROLLING SWITCHING NETWORK OF A POWER REGULATION CIRCUIT

(71) Applicant: City University of Hong Kong, Kowloon (HK)

(72) Inventors: Shu Hung Henry Chung, Mid-levels (HK); Wing To John Fan, New Territories (HK); Shun Cheung Ryan Yeung, Hung Hom (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/701,635

(22) Filed: Sep. 12, 2017

(65) Prior Publication Data
US 2019/0081571 A1  Mar. 14, 2019

(51) Int. Cl.
*H02M 7/219* (2006.01)
*H02M 7/217* (2006.01)
(Continued)

(52) U.S. Cl.
CPC ............ *H02M 7/217* (2013.01); *G05F 1/575* (2013.01); *G06F 1/28* (2013.01); *H02J 5/00* (2013.01);
(Continued)

(58) Field of Classification Search
CPC ............ H02M 7/00; H02M 7/02; H02M 7/04; H02M 7/043; H02M 7/12; H02M 7/21; H02M 7/217; H02M 7/2176; H02M 7/219; H02M 5/40; H02M 5/42; H02M 5/458; H02M 5/4585; H02M 5/453; H02M 3/33569; H02M 3/33584; H02M 3/33592;
(Continued)

(56) References Cited

U.S. PATENT DOCUMENTS

| 2001/0026460 A1* | 10/2001 | Ito ....................... H02M 5/4585 363/34 |
| 2007/0058402 A1* | 3/2007 | Shekhawat ............. H02M 1/42 363/89 |

(Continued)

*Primary Examiner* — Thienvu V Tran
*Assistant Examiner* — Carlos O Rivera-Perez
(74) *Attorney, Agent, or Firm* — Renner Kenner Greive Bobaktaylor & Weber

(57) ABSTRACT

A system for controlling a switching network of a power regulation circuit arranged to regulate power transfer between a first and second circuit connected with the power regulation circuit includes one or more controllers receiving one or more first signals indicative of power characteristics of the first circuit and one or more second signals indicative of power characteristics of the second circuit. The controllers determine, based on the received signals and reference signals, a required power output for regulating power transfer between the first and second circuit, and then select, dynamically, a switching scheme, from predetermined switching schemes, based on the determination result. The predetermined switching schemes represent unique switching schemea for controlling switching of respective switches of the switching network. The controllers generate, based on the dynamically selected switching scheme, output signals for controlling switching of respective switches to regulate power transfer between the first and second circuit.

21 Claims, 9 Drawing Sheets

(51) Int. Cl.
  *H02J 5/00*    (2016.01)
  *G05F 1/575*   (2006.01)
  *G06F 1/28*    (2006.01)
  *H02M 7/5395*  (2006.01)
  *H02M 1/42*    (2007.01)
  *H02M 7/797*   (2006.01)
  *H02M 7/5387*  (2007.01)
  *H02J 3/38*    (2006.01)

(52) U.S. Cl.
  CPC ......... *H02M 1/4233* (2013.01); *H02M 7/219* (2013.01); *H02M 7/5395* (2013.01); *H02M 7/53875* (2013.01); *H02M 7/797* (2013.01); *H02J 3/381* (2013.01); *H02M 2007/53878* (2013.01)

(58) Field of Classification Search
  CPC ........ H02M 1/08; H02M 1/081; H02M 1/082; H02M 1/10; H02M 2001/0009; H02M 2001/0012; H02M 2001/0025; H02M 5/44; H02M 1/42; H02M 1/4208; H02M 1/4216; H02M 1/4225; H02M 1/4258; H02M 1/4233; H02M 2001/0016; H02M 2001/0019; H02M 2001/0022; H02M 2001/0083; H02M 2007/53876; H02M 2007/53878; H02M 2007/2195; G05F 1/46; G05F 1/575; G06F 1/26; G06F 1/28; H02J 5/00; H02J 5/005; H02J 3/381
  USPC ..... 363/15–21.03, 21.06, 21.1, 21.11, 21.14, 363/21.18, 34, 35, 37, 40–48, 74, 79, 81, 363/84, 88, 123–127, 131–134; 323/205–211, 222–226, 239, 271–275, 323/282–285, 299–303, 351
  See application file for complete search history.

(56) References Cited

U.S. PATENT DOCUMENTS

| | | | |
|---|---|---|---|
| 2010/0244775 A1* | 9/2010 | Smith | H02M 3/33584 320/140 |
| 2015/0070952 A1* | 3/2015 | Ishii | H02M 7/5395 363/78 |
| 2018/0034360 A1* | 2/2018 | Hirabayashi | H02M 1/088 |

* cited by examiner

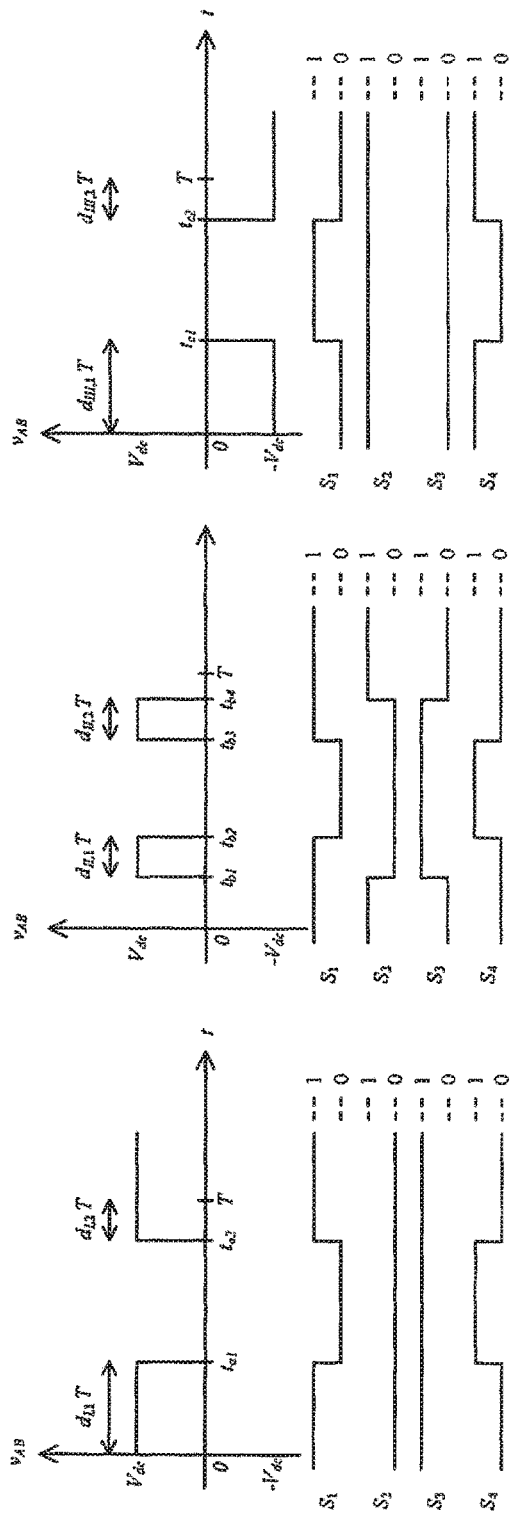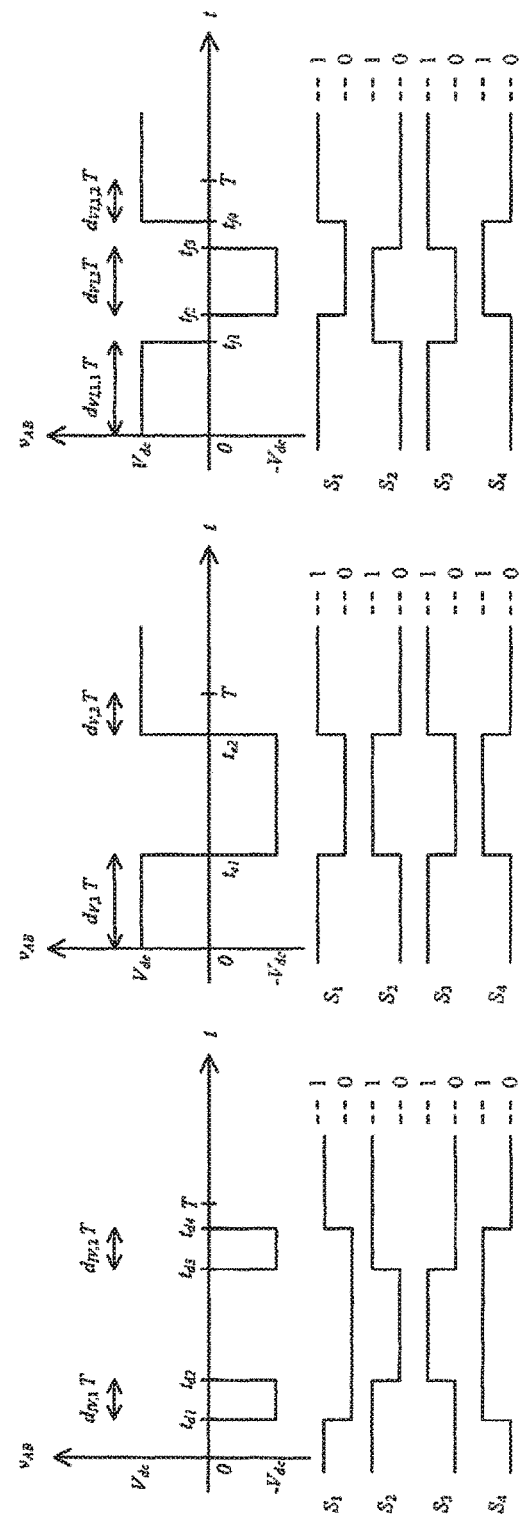

SYSTEM AND METHOD FOR CONTROLLING SWITCHING NETWORK OF A POWER REGULATION CIRCUIT

TECHNICAL FIELD

The invention relates to a system and method for controlling a switching network of a power regulation circuit. Particularly, although not exclusively, the invention relates to a system and method for adaptively modulation control for a switching network of a power regulation circuit in power electronics systems.

BACKGROUND

In today's environmentally-conscious world, the reliability and quality of existing electrical power system and deployment of new sustainable and renewable energies are critical. An emerging trend in the electricity industry is a paradigm shift from centralized power plant to small-scale distributed energy resources (DER) located at the point of consumption to conceptualize the idea of microgrid—a group of interconnected loads and DER with clearly defined electrical boundaries that act as a single controllable entity with respect to the grid. Such infrastructure can enhance asset utilization, power quality, and system reliability, flexibility and capacity. It also ensures power supply continuity to critical loads, such as data centers, hospitals, and banks, irrespective of any abnormal conditions in the microgrid.

The majority of microgrid demonstrations and deployments rely on AC power transfer as this has been the traditionally dominant electrical power delivery method. Recently, DC distribution has also been demonstrated to be a promising way to combine DER and energy storage systems for managing power utilization among multiple electronic loads, as DER and energy-efficient electronic loads are dominantly DC-operated. To combine the merits of microgrids and DC distribution, the concept of hybrid AC-DC microgrid is being significantly evolved. The separately established AC and DC microgrids are connected to each other through bidirectional AC-DC converters that control and maintain the quality and stability of the power flow between them. Such architecture simplifies the power conversion steps, leading to improved economic operation and efficient use of energies.

It is conceivable that electrical power system in the near future will have many bidirectional AC-DC converters interlinked with each other. Such scenario will pose significant challenges to technologists to advance current bidirectional AC-DC conversion technology for dealing with power flow control, power sharing schemes, interactions among converters under stiff and weak grid condition, fault interruption capability, power quality issues, and future statutory grid codes.

SUMMARY OF THE INVENTION

In accordance with a first aspect of the invention, there is provided a system for controlling a switching network of a power regulation circuit, comprising one or more controllers arranged to: receive one or more first signals indicative of power characteristics of a first circuit connected with the power regulation circuit and one or more second signals indicative of power characteristics of a second circuit connected with the power regulation circuit; determine, based on the received signals and one or more reference signals, a required power output of the switching network for regulating power transfer between the first circuit and the second circuit; select, dynamically, a switching scheme from a plurality of predetermined switching schemes based on the determination result, each of the predetermined switching scheme representing a unique switching scheme for controlling switching of respective switches of the switching network; and generate, based on the dynamically selected switching scheme, output signals for controlling switching of respective switches of the switching network to regulate power transfer between the first circuit and the second circuit. The one or more controllers refer generally to circuits and/or electronic elements that can provide control function. For example, a controller may be a control circuit, a logic circuit, a microcontroller, a controller, a MCU, a CPU, etc., or any combination thereof.

In one embodiment of the first aspect, the switching network comprises a first pair of switches and a second pair of switches arranged in parallel with each other; and a power output of the switching network is related to a voltage or potential difference across a first node between the first pair of switches and a second node between the second pair of switches.

In a preferred embodiment of the first aspect, the required power output of the switching network is determined based on a ratio G defined by: a required per-switching-period-mean voltage across the first and second nodes to a voltage across the second circuit, where $-1 \leq G \leq 1$. Preferably, an absolute value of the voltage across the first and second nodes is equal to an absolute value of the voltage across the second circuit for some but not all time during each switching period.

In one embodiment of the first aspect, the plurality of predetermined switching schemes comprises two, three, four, five, or all of the following: a first switching scheme arranged to control the switches such that the power output of the switching network is a first voltage value during 0 to $t_{a1}$ and $t_{a2}$ to T for each switching period T, where $0 < t_{a1} < t_{a2} < T$; a second switching scheme arranged to control the switches such that the power output of the switching network is the first voltage value during $t_{b1}$ to $t_{b2}$ and $t_{b3}$ to $t_{b4}$ for each switching period T, where $0 < t_{b1} < t_{b2} < t_{b3} < t_{b4} < T$; a third switching scheme arranged to control the switches such that the power output of the switching network is a second voltage value during 0 to $t_{c1}$ and $t_{c2}$ to T for each switching period T, where $0 < t_{c1} < t_{c2} < T$, and the second voltage value is an additive inverse of the first voltage value; a fourth switching scheme arranged to control the switches such that the power output of the switching network is the second voltage value during $t_{d1}$ to $t_{d2}$ and $t_{d3}$ to $t_{d4}$ for each switching period T, where $0 < t_{d1} < t_{d2} < t_{d3} < t_{d4} < T$; a fifth switching scheme arranged to control the switches such that the power output of the switching network is the first voltage value during 0 to $t_{e1}$ and $t_{e2}$ to T and the second voltage value during $t_{e1}$ to $t_{e2}$ for each switching period T, where $0 < t_{e1} < t_{e2} < T$; and a sixth switching scheme arranged to control the switches such that the power output of the switching network is the first voltage value during 0 to $t_{f1}$ and $t_{f4}$ to T and the second voltage value during $t_{f2}$ to $t_{f3}$ for each switching period T, where $0 < t_{f1} < t_{f2} < t_{f3} < t_{f4} < T$; wherein all of the predetermined switching schemes have the same switching period T.

Preferably, the power output of the switching network is symmetric about T/2 for each switching period T, for all predetermined switching schemes.

Preferably, the plurality of predetermined switching schemes comprises: the first switching scheme, the third switching scheme, and one of: (i) the second and fourth switching schemes; (ii) the fifth switching scheme; and (iii) the sixth switching scheme.

In one embodiment of the first aspect, the one or more controllers are arranged to select the first switching scheme when it is determined that $⅓<G≤1$; select the third switching scheme when it is determined that $-1≤G<-⅓$; select one of the following: (i) the second switching scheme when it is determined that $0≤G<⅓$ and the fourth switching scheme when it is determined that $-⅓<G≤0$; (ii) the fifth switching scheme when it is determined that $-⅓≤G≤⅓$; and (iii) the sixth switching scheme when it is determined that $-⅓≤G≤⅓$.

Preferably, all of the predetermined switching schemes have the same maximum switching frequency for the switches (while the switching frequency of the switches need not be identical).

Preferably, each of the predetermined switching schemes requires at most 2 switching actions for each respective switch in one switching period T.

In one embodiment of the first aspect, the system further comprises one or more storage, operably coupled with the one or more controllers, for storing the plurality of predetermined switching schemes. Optionally, the one or more storage may be integrated with one or more of the controllers.

In one embodiment of the first aspect, the one or more controllers is further arranged to generate the one or more reference signals. Alternatively, the one or more controllers is further arranged to receive the one or more reference signals from an external source. The one or more reference signals may be fixed, or can be adjustable.

In one embodiment of the first aspect, the one or more first signals comprises: a current signal indicative of a current in the first circuit; and a voltage signal indicative of a voltage across the first circuit. Also, the one or more second signals comprises: a current signal indicative of a current in the second circuit; and a voltage signal indicative of a voltage across the second circuit. The one or more reference signals may comprise a reference current signal indicative of a reference current for the first circuit.

Preferably, the switches comprise semiconductor switches. In one example, the switches are MOSFET switches.

In a preferred embodiment of the first aspect, the one or more controllers comprise a controller and a PWM modulator. The controller may be arranged to receive or detect one or more first signals indicative of power characteristics of a first circuit connected with the power regulation circuit and one or more second signals indicative of power characteristics of a second circuit connected with the power regulation circuit; determine, based on the received signals and one or more reference signals, a required power output of the switching network for regulating power transfer between the first circuit and the second circuit; and then generate a corresponding control signal. The PWM modulator operably connected with the controller may receive the control signal; select, dynamically, a switching scheme from a plurality of predetermined switching schemes based on the control signal, each of the predetermined switching scheme representing a unique switching scheme for controlling switching of respective switches of the switching network; and generate, based on the dynamically selected switching scheme, output signals for controlling switching of respective switches of the switching network to regulate power transfer between the first circuit and the second circuit. The output signals may be provided to the drive and subsequently to the switches in the form of gating signals.

In a preferred embodiment of the first aspect, the first circuit is an AC power circuit or network; the second circuit is a DC power circuit or network. The AC power circuit or network may be a power grid such as an AC microgrid. The DC power circuit or network may be a power grid such as a DC microgrid. The first circuit may be connected with load or power source or both; likewise the second circuit may be connected with load or power source or both.

In a preferred embodiment of the first aspect, the power regulation circuit is arranged to regulate bi-directional power transfer between the first circuit and the second circuit.

In accordance with a second aspect of the invention, there is provided a power regulation circuit for regulating power transfer between a first circuit and a second circuit, comprising: a switching network comprises a first pair of switches and a second pair of switches arranged in parallel with each other, arranged between the first and second circuits; one or more controllers arranged to: receive one or more first signals indicative of power characteristics of a first circuit connected with the power regulation circuit and one or more second signals indicative of power characteristics of a second circuit connected with the power regulation circuit; determine, based on the received signals and one or more reference signals, a required voltage across a first node between the first pair of switches and a second node between the second pair of switches for regulating power transfer between the first circuit and the second circuit; select, dynamically, a switching scheme from a plurality of predetermined switching schemes based on the determination result, each of the predetermined switching scheme representing a unique switching scheme for controlling switching of respective switches of the switching network; and generate, based on the dynamically selected switching scheme, output signals for controlling switching of respective switches of the switching network to regulate power transfer between the first circuit and the second circuit. The one or more controllers refer generally to circuits and/or electronic elements that can provide control function. For example, a controller may be a control circuit, a logic circuit, a microcontroller, a controller, a MCU, a CPU, etc., or any combination thereof.

In one embodiment of the second aspect, the power regulation circuit further includes one or more storage, operably coupled with the one or more controllers, for storing the plurality of predetermined switching schemes.

In one embodiment of the second aspect, the power regulation circuit further includes an inductor arranged at an interface between the first node and the first circuit; and a capacitor across the second circuit, at an interface between the switching network and the second circuit.

In a preferred embodiment of the second aspect, the power regulation circuit further includes first circuit is an AC power network and the second circuit is a DC power network. The AC power circuit or network may be a power grid such as an AC microgrid. The DC power circuit or network may be a power grid such as a DC microgrid. The first circuit may be connected with load or power source or both; likewise the second circuit may be connected with load or power source or both.

In a preferred embodiment of the second aspect, the power regulation circuit is arranged to regulate bi-directional power transfer between the first and second circuits.

In a preferred embodiment of the second aspect, the one or more controllers are the one or more controllers in the first aspect of the invention. In other words, features applicable to the controllers in the first aspect are also applicable to the controllers in the second aspect.

Optionally, the power regulation circuit in the second aspect may be the power regulation circuit in the first aspect.

In accordance with a third aspect of the invention, there is provided method for controlling a switching network of a power regulation circuit, comprising: receiving one or more first signals indicative of power characteristics of a first circuit connected with the power regulation circuit and one or more second signals indicative of power characteristics of a second circuit connected with the power regulation circuit; determining, based on the received signals and one or more reference signals, a required power output of the switching network for regulating power transfer between the first circuit and the second circuit; selecting, dynamically, a switching scheme from a plurality of predetermined switching schemes based on the determination result, each of the predetermined switching scheme representing a unique switching scheme for controlling switching of respective switches of the switching network; and generating, based on the dynamically selected switching scheme, output signals for controlling switching of respective switches of the switching network to regulate power transfer between the first circuit and the second circuit.

In one embodiment of the third aspect, the switching network comprises a first pair of switches and a second pair of switches arranged in parallel with each other; and a power output of the switching network is related to a voltage across a first node between the first pair of switches and a second node between the second pair of switches.

In a preferred embodiment of the third aspect, the required power output of the switching network is determined based on a ratio G defined by: a required per-switching-period-mean voltage across the first and second nodes to a voltage across the second circuit, where $-1 \leq G \leq 1$.

In one embodiment of the third aspect, the plurality of predetermined switching schemes comprises two or more of the following: a first switching scheme arranged to control the switches such that the power output of the switching network is a first voltage value during 0 to $t_{a1}$ and $t_{a2}$ to T for each switching period T, where $0 < t_{a1} < t_{a2} < T$; a second switching scheme arranged to control the switches such that the power output of the switching network is the first voltage value during $t_{b1}$ to $t_{b2}$ and $t_{b3}$ to $t_{b4}$ for each switching period T, where $0 < t_{b1} < t_{b2} < t_{b3} < t_{b4} < T$; a third switching scheme arranged to control the switches such that the power output of the switching network is a second voltage value during 0 to $t_{c1}$ and $t_{c2}$ to T for each switching period T, where $0 < t_{c1} < t_{c2} < T$, and the second voltage value is an additive inverse of the first voltage value; a fourth switching scheme arranged to control the switches such that the power output of the switching network is the second voltage value during $t_{d1}$ to $t_{d2}$ and $t_{d3}$ to $t_{d4}$ for each switching period T, where $0 < t_{d1} < t_{d2} < t_{d3} < t_{d4} < T$; a fifth switching scheme arranged to control the switches such that the power output of the switching network is the first voltage value during 0 to $t_{e1}$ and $t_{e2}$ to T and the second voltage value during $t_{e1}$ to $t_{e2}$ for each switching period T, where $0 < t_{e1} < t_{e2} < T$; and a sixth switching scheme arranged to control the switches such that the power output of the switching network is the first voltage value during 0 to $t_{f1}$ and $t_{f4}$ to T and the second voltage value during $t_{f2}$ to $t_{f3}$ for each switching period T, where $0 < t_{f1} < t_{f2} < t_{f3} < t_{f4} < T$; wherein all of the predetermined switching schemes have the same switching period T.

In a preferred embodiment of the third aspect, the power output of the switching network is symmetric about T/2 for each switching period T, for all predetermined switching schemes.

In one embodiment of the third aspect, the method further comprises: selecting the first switching scheme when it is determined that $1/3 < G \leq 1$; selecting the third switching scheme when it is determined that $-1 \leq G < -1/3$; selecting one of the following: (i) the second switching scheme when it is determined that $0 \leq G < 1/3$ and the fourth switching scheme when it is determined that $-1/3 < G \leq 0$; the fifth switching scheme when it is determined that $-1/3 \leq G \leq 1/3$; and the sixth switching scheme when it is determined that $-1/3 \leq G \leq 1/3$.

In a preferred embodiment of the third aspect, the one or more controllers are the one or more controllers in the first aspect of the invention. In other words, features applicable to the controllers in the first aspect are also applicable to the controllers in the third aspect.

In a preferred embodiment of the third aspect, the power regulation circuit is the power regulation circuit in the second aspect of the invention. In other words, features applicable to the power regulation circuit in the second aspect are also applicable to the power regulation circuit in the third aspect.

In accordance with a fourth aspect of the invention, there is provided a non-transitory computer readable medium for storing computer instructions that, when executed by one or more controllers, causes the one or more controllers to perform the method of the third aspect. The one or more controllers refer generally to circuits and/or electronic elements that can provide control function. For example, a controller may be a control circuit, a logic circuit, a microcontroller, a controller, a MCU, a CPU, etc., or any combination thereof.

In accordance with a fifth aspect of the invention, there is provided a system for controlling a switching network of a power regulation circuit, comprising: means for receiving one or more first signals indicative of power characteristics of a first circuit connected with the power regulation circuit and one or more second signals indicative of power characteristics of a second circuit connected with the power regulation circuit; means for determining, based on the received signals and one or more reference signals, a required power output of the switching network for regulating power transfer between the first circuit and the second circuit; means for selecting, dynamically, a switching scheme from a plurality of predetermined switching schemes based on the determination result, each of the predetermined switching scheme representing a unique switching scheme for controlling switching of respective switches of the switching network; and means for generating, based on the dynamically selected switching scheme, output signals for controlling switching of respective switches of the switching network to regulate power transfer between the first circuit and the second circuit.

In accordance with a sixth aspect of the invention, there is provided a power network or circuit comprising the one or more controllers in the first aspect.

In accordance with a seventh aspect of the invention, there is provided a power network or circuit comprising the power regulation circuit in the second aspect.

In accordance with an eighth seventh aspect of the invention, there is provided a power network or circuit comprising the system in the fifth aspect.

BRIEF DESCRIPTION OF THE DRAWINGS

Embodiments of the invention will now be described, by way of example, with reference to the accompanying drawings in which:

FIG. 3A is a first switching scheme that can be used by the power regulation circuit for controlling power transfer in accordance with one embodiment of the invention;

FIG. 3B is a second switching scheme that can be used by the power regulation circuit for controlling power transfer in accordance with one embodiment of the invention;

FIG. 3C is a third switching scheme that can be used by the power regulation circuit for controlling power transfer in accordance with one embodiment of the invention;

FIG. 3D is a fourth switching scheme that can be used by the power regulation circuit for controlling power transfer in accordance with one embodiment of the invention;

FIG. 3E is a fifth switching scheme that can be used by the power regulation circuit for controlling power transfer in accordance with one embodiment of the invention;

FIG. 3F is a sixth switching scheme that can be used by the power regulation circuit for controlling power transfer in accordance with one embodiment of the invention;

DETAILED DESCRIPTION OF THE PREFERRED EMBODIMENT

Figure 1:
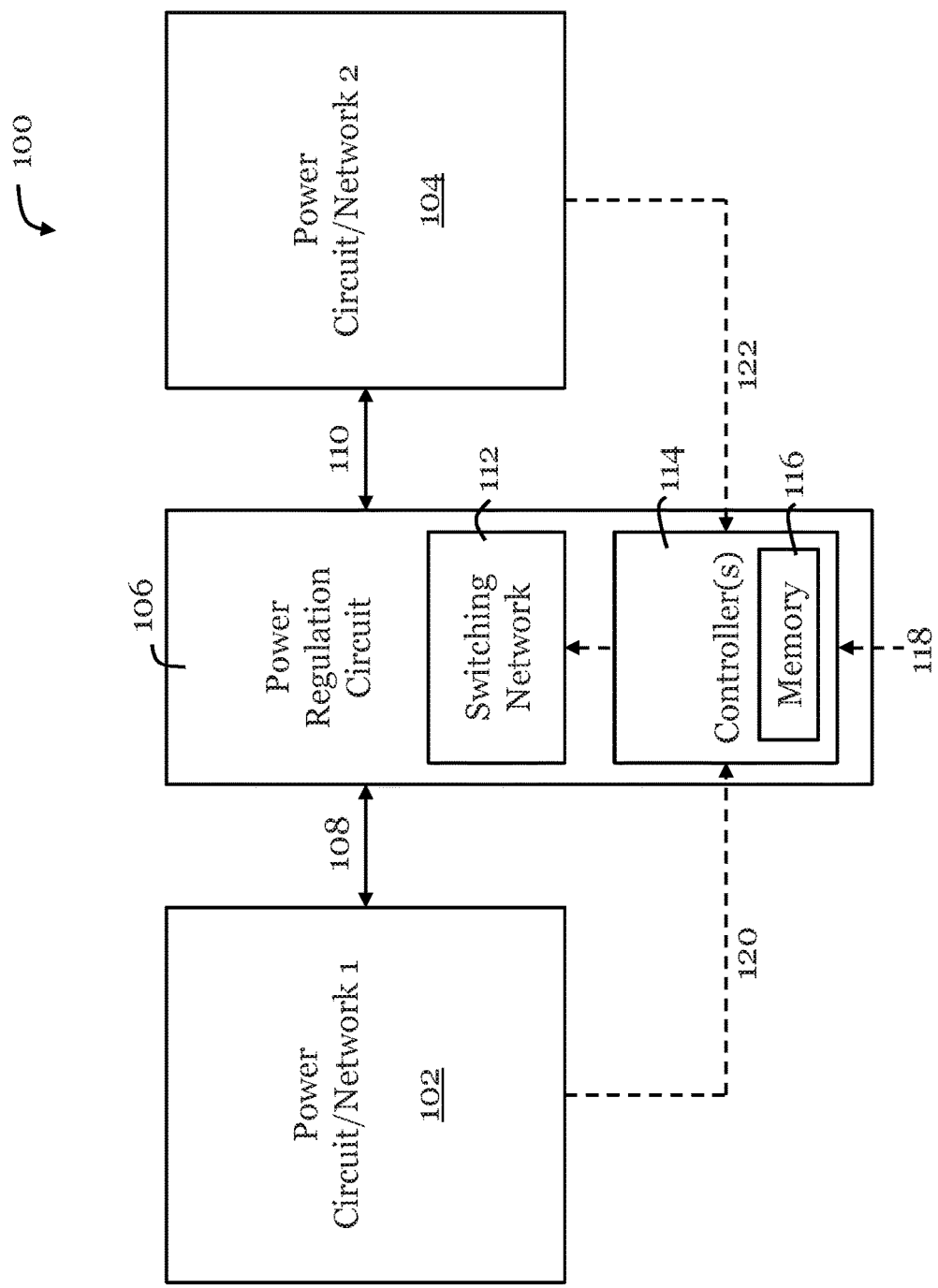
FIG. 1 is a block diagram showing general construction of a power electronics system with a power regulation circuit in accordance with one embodiment of the invention.

FIG. 1 shows a simplified power electronics system 100 with a power regulation circuit 106 in accordance with one embodiment of the invention. The power electronics system 100 includes a first power circuit 102, a second power circuit 104, and a power regulation circuit 106 arranged between the first and second power circuits 102, 104. The power regulation circuit 106 is coupled with the first circuit 102 via a first power transfer link 108 that is preferably a bi-directional link, and is coupled with the second circuit 104 via a second power transfer link 110 that is preferably a bi-directional link. The first power circuit 102 is preferably an AC power network, but may also be a DC power network. The second power circuit 104 is preferably a DC power network, but may also be an AC power network. Each of the first and second power circuits 102, 104 may include one or more power sources or loads connected therewith.

The power regulation circuit 106 comprises a switching network 112 with switches, and one or more controllers 114 for controlling operation of the switches in the switching network 112. The one or more controllers comprise circuits and/or electronic elements that can provide processing function. For example, a controller may be a controller, a control circuit, a logic circuit, a microcontroller, a MCU, a CPU, etc., or any combination thereof. By controlling the operation of the switches in the switching network 112, the power output of the power regulation circuit 106 can be controlled to regulate power transfer between the first power circuit 102 and the second power circuit 104. The power regulation circuit 106 also includes a memory module 116 for storing switching schemes for the switches. The memory module 116 may be integrated with the controller(s) 114 as shown, or in some cases, be a separate module operably connected with the controller(s) 114.

The controller(s) 114 is arranged to receive signals indicative of power characteristics of the first power circuit 102 and signals indicative of power characteristics of the second power circuit 104 through links 120, 122. In one example, these signals may include signals indicative of: a current at the input or output in the first power circuit 102, a voltage across the input or output of the first power circuit 102, a current at the input or output in the second power circuit 104, and a voltage across the input or output of the second power circuit 104. With the received signals, the controller(s) 114 then determine, based on one or more reference signals 118, a required power output of the switching network 112 for properly regulating power transfer between the two circuits 102, 104. In one example, the reference signals 118 may be a reference current signal, a reference voltage signal, or the like. The reference signal 118 may be generated by the controller(s) 114, or may be received from an external source. The reference signal 118 may be fixed or adjustable. Upon determining the required power output, the controller(s) 114 then select, dynamically, a switching scheme from various predetermined switching schemes stored in the memory 116. In the invention, each of the predetermined switching schemes represents a unique switching scheme for controlling switching of respective switches of the switching network 112, and preferably each scheme is more useful than others in different operation regimes. After selecting a switching scheme, the controller(s) 114 then generate, based on the dynamically selected switching scheme, output signals for controlling switching of respective switches of the switching network 112. The output signals are provided to the switches for controlling switching and hence to regulate power transfer between the two circuits 102, 104.

Figure 2:
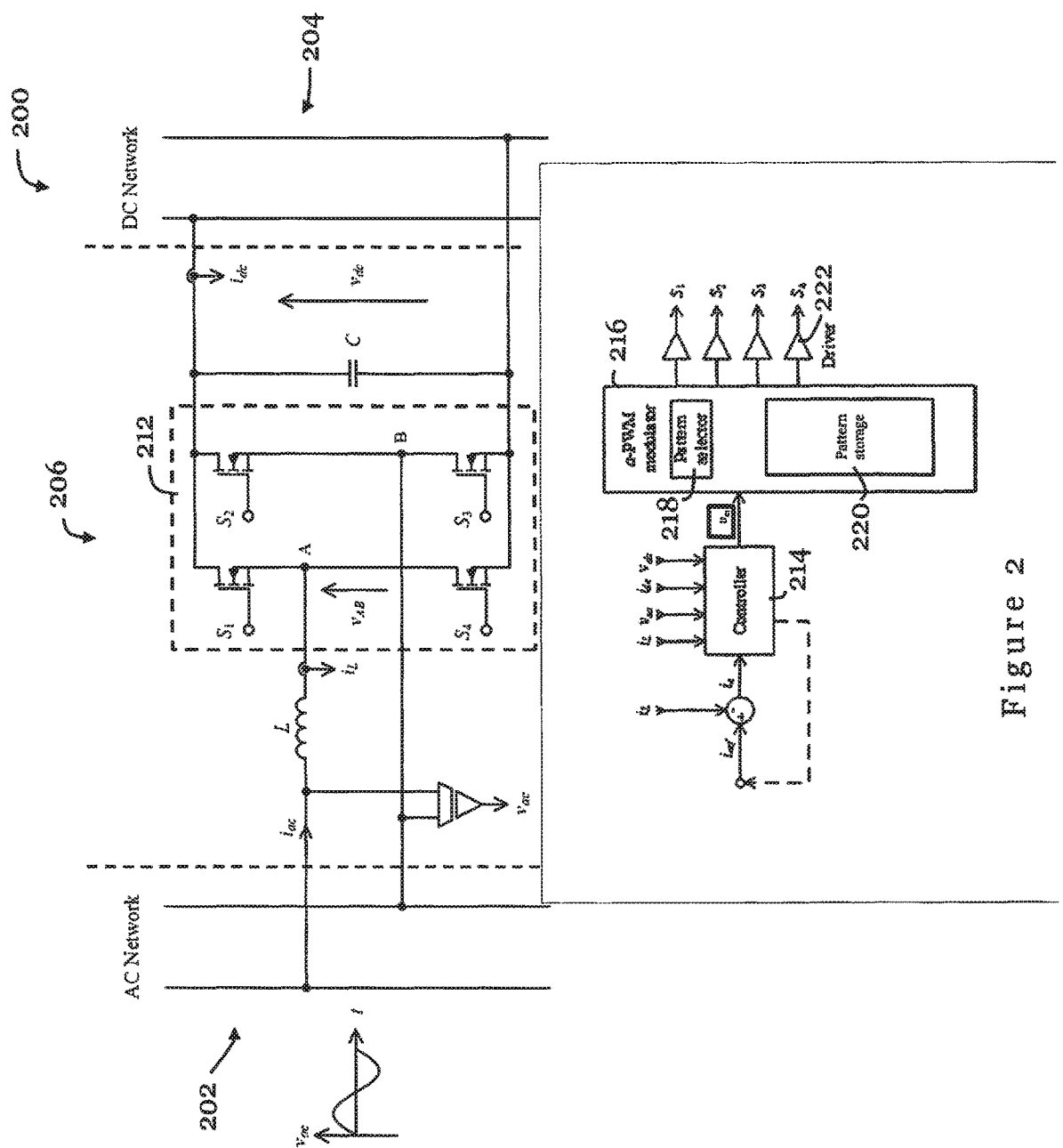
FIG. 2 is a schematic diagram showing a power electronics system with a power regulation circuit in accordance with one embodiment of the invention.

FIG. 2 shows a power electronics system 200 with a power regulation circuit 206 in accordance with one embodiment of the invention. As shown, the power electronics system 200 is formed by an AC power network 202, a DC power network 204, and a power regulation circuit 206 in the form of an AC-DC converter for regulating power transfer between the two networks 202, 204. In the present embodiment, the power regulation circuit 206 includes a power conversion stage and a controller and modulator. The power conversion stage includes a switching network 212, an inductor L, and a capacitor C. The switching network 212 includes a first pair of switches $S_1$, $S_4$ and a second pair of switches $S_2$, $S_3$ arranged in parallel with each other. The switches $S_1$ to $S_4$ are preferably semiconductor switches such as MOSFETs. As shown in FIG. 2, the switching network 212 is connected, on one side, to the AC power network 202 through two power bus/lines connecting with node A between the first pair of switches $S_1$, $S_4$ and node B between the second pair of switches $S_2$, $S_3$. In this example, the inductor L is provided on the bus connected with node A, but in some other cases, the inductor L may be provided on the bus connected with node B. In this embodiment, the inductor L serves as a filter to reduce the ripple on the AC-side current $i_{ac}$. The switching network 212 is connected, on the other side, to the DC power network through a parallel capacitor C connected across (parallel with) the first pair of switches $S_1$, $S_4$ and the second pair of switches $S_2$, $S_3$. In this embodiment, the capacitor C serves as another filter to stabilize and reduce the ripple on the DC-side voltage $v_{dc}$.

In operation, the switches $S_1$ to $S_4$ are switched at a frequency much higher than the frequency of the AC power network 202, so that the waveform of the inductor current $i_L$, which is also the AC-side current $i_{ac}$, can be profiled in a predefined waveform with respect to the AC-side voltage $v_{ac}$. Advantageously, such high-frequency switching can reduce the physical size of the inductor L.

In one example, the power regulation circuit 206 is operated as a power factor corrector, in which the AC-side current $i_{ac}$ is controlled to be in phase with and in the same wave shape as the AC-side voltage $v_{ac}$. In another example, the power regulation circuit 206 is operated as a grid-tie inverter to deliver sinusoidal current to the AC power network.

In the present embodiment, the controller 214 of the power regulation circuit 206 is used to profile the waveform of $i_{ac}$. In particular, the controller 214 senses the inductor current $i_L$ (which is the same as $i_{ac}$) and compares it with a current reference $i_{ref}$ to determine an error $i_e$. The error $i_e$, together with the AC-side voltage $v_{ac}$, DC-side voltage $v_{dc}$ and DC-side current $i_{dc}$, are processed by the controller 214. The current reference $i_{ref}$ may be received from an external source (not shown) or may be generated by the controller 214 internally. The current reference $i_{ref}$ may be adjustable. The controller 214, after processing the received current and voltage signals, generates a modulating signal $v_m$ to the modulator 216. The modulating signal $v_m$ relates to a required voltage output across nodes A and B of the switching network for regulating power transfer between two power networks 202, 204. The modulating signal $v_m$ is preferably slow-varying as the main function of the controller 214 is to compare the low-frequency components of $i_{ref}$ and $i_L$ and/or to regulate the DC-side voltage $v_{dc}$.

Preferably, the modulator 216 is a PWM modulator, and it includes a switching scheme (pattern) storage 220 for storing multiple predetermined switching schemes (patterns) for controlling the switches $S_1$ to $S_4$, and a switching scheme (pattern) selector 218 for selecting a suitable switching scheme based on the modulating signal $v_m$. The modulator 216 is arranged to dynamically select a switching scheme from the predetermined switching schemes in the pattern storage 220 based on the received modulating signal $v_m$. The modulator 216, along with drivers 222 for the respective switches $S_1$ to $S_4$, then generate and transmit gating signals to the respective switches $S_1$ to $S_4$. The output voltage $v_{AB}$ across nodes A and B can then be regulated to control power transfer between the two power networks 202, 204. The dynamic selection of the switching schemes allow the power regulation circuit 206 to readily respond to changes in power transfer condition between the two networks by changing switching schemes on demand.

FIGS. 3A-3F show six different switching schemes that may be used in the controller(s) of FIG. 1 and the modulator in FIG. 2. Preferably, all six switching schemes have the same switching period is T. Preferably, for all switching schemes, the switches $S_1$ to $S_4$ have at most two switching actions (switch-on is one action, switch-off is one action) within one switching period. The maximum switching frequency of the switches $S_1$ to $S_4$ in all six schemes is preferably the same.

In the first switching scheme (I) shown in FIG. 3A, the switches are controlled such that, in each period T, $S_1$ is switched on during 0 to $t_{a1}$ and $t_{a2}$ to T; $S_2$ is always off; $S_3$ is always on; $S_4$ is switched on during $t_{a1}$ to $t_{a2}$, where $0<t_{a1}<t_{a2}<T$. The resulting voltage $v_{AB}$ produced has a value $V_{dc}$ during 0 to $t_{a1}$ and $t_{a2}$ to T, and is 0 otherwise, in the same period T.

In the second switching scheme (II) shown in FIG. 3B, the switches are controlled such that, in each period T, $S_1$ is switched on during 0 to $t_{b2}$ and $t_{b3}$ to T; $S_2$ is switched on during 0 to $t_{b1}$ and $t_{b4}$ to T; $S_3$ is switched on during $t_{b1}$ to $t_{b4}$; $S_4$ is switched on during $t_{b2}$ to $t_{b3}$, where $0<t_{b1}<t_{b2}<t_{b3}<t_{b4}<T$. The resulting voltage $v_{AB}$ produced has a value $V_{dc}$ during $t_{b1}$ to $t_{b2}$ and $t_{b3}$ to $t_{b4}$, and is 0 otherwise, in the same period T.

In the third switching scheme (III) shown in FIG. 3C, the switches are controlled such that, in each period T, $S_1$ is switched on during $t_{c1}$ to $t_{c2}$; $S_2$ is always on; $S_3$ is always off; $S_4$ is switched on during 0 to $t_{c1}$ and $t_{c2}$ to T, where $0<t_{c1}<t_{c2}<T$. The resulting voltage $v_{AB}$ produced has a value $-V_{dc}$ during 0 to $t_{c1}$ and $t_{c2}$ to T, and is 0 otherwise, in the same period T.

In the fourth switching scheme (IV) shown in FIG. 3D, the switches are controlled such that, in each period T, $S_1$ is switched on during 0 to $t_{d1}$ and $t_{d4}$ to T; $S_2$ is switched on during 0 to $t_{d2}$ and $t_{d3}$ to T; $S_3$ is switched on during $t_2$ to $t_3$; $S_4$ is switched on during $t_{d1}$ to $t_{d4}$, where $0<t_{d1}<t_{d2}<t_{d3}<t_{d4}<T$. The resulting voltage $v_{AB}$ produced has a value $-V_{dc}$ during $t_{d1}$ to $t_{d2}$ and $t_{d3}$ to $t_{d4}$, and is 0 otherwise, in the same period T.

In the fifth switching scheme (V) shown in FIG. 3E, the switches are controlled such that, in each period T, $S_1$ and $S_3$ are switched on during 0 to $t_{e1}$ and $t_{e2}$ to T; $S_2$ and $S_4$ are switched on during $t_{e1}$ to $t_{e2}$, where $0<t_{e1}<t_{e2}<T$. The resulting voltage $v_{AB}$ produced has a value $V_{dc}$ during 0 to $te_1$ and $te_2$ to T and a value $-V_{dc}$ during $t_{e1}$ to $t_{e2}$, in the same period T.

In the sixth switching scheme (VI) shown in FIG. 3F, the switches are controlled such that, in each period T, $S_1$ is switched on during 0 to $t_{f2}$ and $t_{f4}$ to T; $S_2$ is switched on during $t_{f1}$ to $t_{f3}$; $S_3$ is switched on during 0 to $t_{f1}$ and $t_{f3}$ to T; $S_4$ is switched on during $t_{f2}$ to $t_{f4}$, where $0<t_{f1}<t_{f2}<t_{f3}<t_{f4}<T$. The resulting voltage $v_{AB}$ produced has a value $V_{dc}$ during 0 to $t_{f1}$ and $t_{f4}$ to T, $-V_{dc}$ during $t_{f2}$ to $t_{f3}$, and is 0 otherwise, in the same period T.

The cycle mean of $v_{AB}$, $\nabla_{AB}$, of each of the switching schemes in FIGS. 3A-3F is given in Table I.

TABLE I

Cycle Mean of $v_{AB}$ of each pattern (switching scheme)

| Pattern | $\nabla_{AB}$ |
|---|---|
| I | $(d_{I,1} + d_{I,2}) V_{dc}$ |
| II | $(d_{II,1} + d_{II,2}) V_{dc}$ |
| III | $-(d_{III,1} + d_{III,2}) V_{dc}$ |
| IV | $-(d_{IV,1} + d_{IV,2}) V_{dc}$ |
| V | $[2(d_{V,1} + d_{V,2}) - 1] V_{dc}$ |
| VI | $(d_{VI,1,1} + d_{VI,1,2} - d_{VI,2}) V_{dc}$ |

Consider that the patterns have the same value of $\nabla_{AB}$ for a given $V_{dc}$. That is, $$\frac{V_{AB}}{V_{dc}} = G \quad (1)$$

If $G \geq o$, $$d_{I,1} + d_{I,2} = G \quad (2)$$

$$d_{II,1} + d_{II,2} = G \quad (3)$$

$$d_{V,1} + d_{V,2} = \frac{1}{2}(1 + G) \quad (4)$$

$$d_{VI,1,1} + d_{VI,1,2} - d_{VI,2} = G \quad (5)$$

As shown above, patterns III and IV cannot give positive value of G. Conversely, if $G \leq 0$, patterns I and II cannot give a negative value of G. Equations (4) and (5) still hold. Moreover, $$d_{III,1} + d_{III,2} = -G \quad (6)$$

$$d_{IV,1} + d_{IV,2} = -G \quad (7)$$

The duty cycle of the switches of each pattern are shown in Table II.

TABLE II

Duty Cycle of the Switches

| Pattern | $S_1$ | $S_2$ | $S_3$ | $S_4$ |
|---|---|---|---|---|
| I* | $d_{I,1} + d_{I,2}$ | 0 | 1 | $1 - d_{I,1} - d_{I,2}$ |
| II* | $\frac{1}{2}(1 + d_{II,1} + d_{II,2})$ | $\frac{1}{2}(1 - d_{II,1} - d_{II,2})$ | $\frac{1}{2}(1 + d_{II,1} + d_{II,2})$ | $\frac{1}{2}(1 - d_{II,1} - d_{II,2})$ |
| III** | $1 - d_{III,1} - d_{III,2}$ | 1 | 0 | $d_{III,1} + d_{III,2}$ |
| IV** | $\frac{1}{2}(1 - d_{IV,1} - d_{IV,2})$ | $\frac{1}{2}(1 + d_{IV,1} + d_{IV,2})$ | $\frac{1}{2}(1 - d_{IV,1} - d_{IV,2})$ | $\frac{1}{2}(1 + d_{IV,1} + d_{IV,2})$ |
| V | $d_{V,1} + d_{V,2}$ | $1 - d_{V,1} - d_{V,2}$ | $d_{V,1} + d_{V,2}$ | $1 - d_{V,1} - d_{V,2}$ |
| VI | $\frac{1}{2}(1 + d_{VI,1,1} + d_{VI,1,2} - d_{VI,2})$ | $\frac{1}{2}(1 - d_{VI,1,1} - d_{VI,1,2} + d_{VI,2})$ | $\frac{1}{2}(1 + d_{VI,1,1} + d_{VI,1,2} - d_{VI,2})$ | $\frac{1}{2}(1 - d_{VI,1,1} - d_{VI,1,2} + d_{VI,2})$ |

*$G \geq 0$;
**$G \leq 0$

By substituting the above with equations (2)-(7), the duty cycle of the switches can be expressed in terms of G. Table III shows the duty cycles of the switches in various patterns.

TABLE III

Duty Cycle of the Switches in terms of G

| Pattern | $S_1$ | $S_2$ | $S_3$ | $S_4$ |
|---|---|---|---|---|
| I* | G | 0 | 1 | $1 - G$ |
| II* | $\frac{1}{2}(1 + G)$ | $\frac{1}{2}(1 - G)$ | $\frac{1}{2}(1 + G)$ | $\frac{1}{2}(1 - G)$ |
| III** | $1 + G$ | 1 | 0 | $-G$ |
| IV** | $\frac{1}{2}(1 + G)$ | $\frac{1}{2}(1 - G)$ | $\frac{1}{2}(1 + G)$ | $\frac{1}{2}(1 - G)$ |

TABLE III-continued

Duty Cycle of the Switches in terms of G

| Pattern | $S_1$ | $S_2$ | $S_3$ | $S_4$ |
|---|---|---|---|---|
| V | $\frac{1}{2}(1+G)$ | $\frac{1}{2}(1-G)$ | $\frac{1}{2}(1+G)$ | $\frac{1}{2}(1-G)$ |
| VI | $\frac{1}{2}(1+G)$ | $\frac{1}{2}(1-G)$ | $\frac{1}{2}(1+G)$ | $\frac{1}{2}(1-G)$ |

*$G \geq 0$;
**$G \leq 0$

Figure 4:
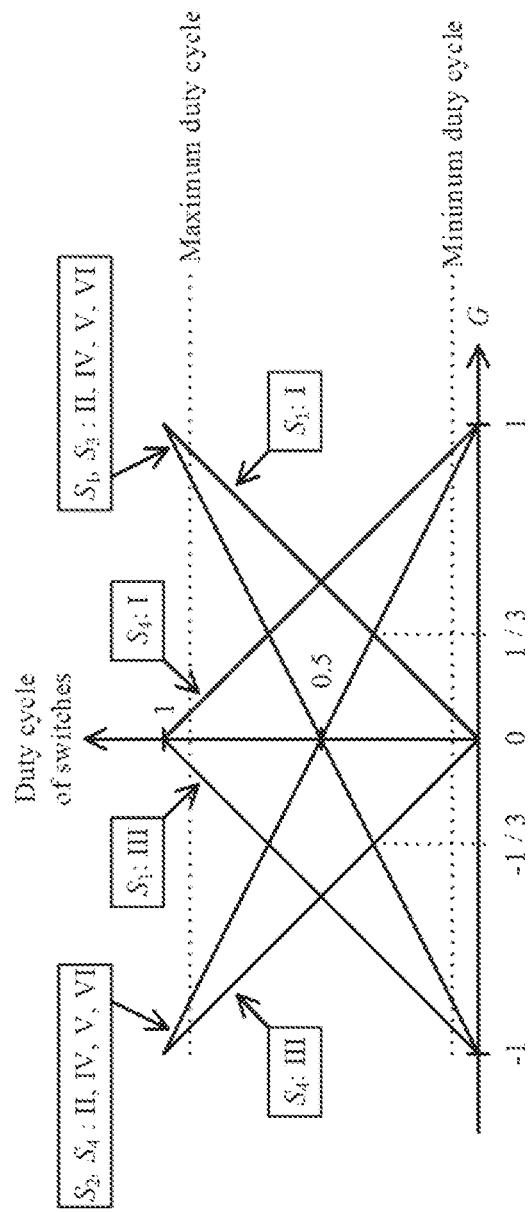
FIG. 4 is a graph showing a relationship between duty cycle of the switches and a ratio (G) of the required per-switching-period-mean of the switching network output $v_{AB}$ with respect to the DC-link voltage $V_{dc}$ for the switching schemes in FIGS. 3A-3F.

FIG. 4 shows the duty cycle of the switches $S_1$ to $S_4$ versus G. The switches without switching in the patterns are not shown. Based on FIG. 4, it can be determined that
1) Patterns I and II only give a positive value of G while patterns III and IV only give a negative value of G.
2) The effective frequency of patterns II and IV is doubled and the two pulses in a switching period must be symmetrical about T/2.
3) Patterns I and III only require two high-frequency-switched devices, while the rest m require four high-frequency-switched devices. Thus, patterns I and III have better conversion efficiency.
4) In patterns I and III, the duty cycle of the switches is either very large or very small for small magnitude of G. If switches are commanded to switch at very small or very large duty cycle, they might not be able to respond accordingly. Thus, some short pulses might be dropped (namely "pulse-dropping"), causing harmonic distortion. As labelled in FIG. 4, the duty cycle of the switches are preferred to be operated between the minimum and maximum duty cycles.
5) Patterns I and III require introducing dead time to ensure that the polarity of $v_{AB}$ must be changed in synchronization with the AC-side voltage. Conversely, patterns II, IV-VI allow a slightly difference between the polarity of $v_{AB}$ and the AC-side voltage. Thus, no dead time is needed.
6) In patterns I-IV, the rate of change of the input inductor current at zero crossings is slow because of low grid voltage. Thus, the grid current is unable to follow the wave shape of the grid voltage, causing zero-crossing distortion. Such phenomenon is particularly obvious if the impedance of the AC power network is high, for example, under weak grid condition. Conversely, patterns V and VI can provide necessary voltage across the inductor. Thus, zero-crossing distortion can be avoided.
7) For $-\frac{1}{3}<G<\frac{1}{3}$, the duty cycles of the switches in patterns II, IV, V, and VI are less different than that in patterns I and III.
8) For $G<-\frac{1}{3}$ or $G>\frac{1}{3}$, the duty cycles of the switches in patterns I and III are less different than that in patterns II, IV, V, and VI.

The merits and limitations of each pattern/scheme are summarized in Table IV.

TABLE IV

Comparison of different patterns

| Pattern | Merits | Limitations |
|---|---|---|
| I | For $G > \frac{1}{3}$, smaller difference in switches' duty cycles | $1 \geq G \geq 0$<br>For $G < \frac{1}{3}$, larger difference in switches' duty cycles |
| II | Two devices in high-frequency switching<br>Effective frequency doubled<br>For $G < \frac{1}{3}$, smaller difference in switches' duty cycles | Zero-crossing dead time required for synchronizing the polarity of $v_{AB}$ with the AC power network<br>$1 \geq G \geq 0$<br>For $G > \frac{1}{3}$, larger difference in switches' duty cycles<br>Zero-crossing distortion caused by low grid voltage<br>Four devices in high-frequency switching |
| III | For $G < -\frac{1}{3}$, smaller difference in switches' duty cycles<br>Two devices in high-frequency switching | $-1 \leq G \leq 0$<br>For $G > -\frac{1}{3}$, larger difference in switches duty cycles<br>Zero-crossing dead time required for synchronizing the polarity of $v_{AB}$ with the AC power network |
| IV | Effective frequency doubled<br>For $G > -\frac{1}{3}$, smaller difference in switches' duty cycles | $-1 \leq G \leq 0$<br>For $G < -\frac{1}{3}$, larger difference in switches' duty cycles<br>Zero-crossing distortion caused by low grid voltage<br>Four devices in high-frequency switching |
| V | $1 \geq G \geq -1$<br>For $\frac{1}{3} \geq G \geq -\frac{1}{3}$, smaller difference in switches' duty cycles<br>No zero-crossing dead time required | For $G < -\frac{1}{3}$ or $G > \frac{1}{3}$, larger difference in switches' duty cycles<br>Two switches state changes simultaneously<br>Four devices in high-frequency switching |
| VI | $1 \geq G \geq -1$<br>For $\frac{1}{3} \geq G \geq -\frac{1}{3}$, smaller difference in switches' duty cycles<br>No zero-crossing dead time required<br>One switch state change | For $G < -\frac{1}{3}$ or $G > \frac{1}{3}$, larger difference in switches' duty cycles<br>Maximum voltage limited by the presence of the zero state<br>Four devices in high-frequency switching |

In operation, the controller 114 or modulator 216 may use any of the switching schemes described, or their variation which can provide the same $v_{AB}$ profile. To avoid the occurrence of "pulse dropping" with small G (due to small duty cycles), patterns II, IV, V, and VI can be used. Alternatively, if the grid impedance is large, patterns V and VI are preferred to reduce zero-crossing distortion. If G is positive and large, patterns I can be used; if G is negative and its absolute value is large, patterns III can be used. It is because patterns I and III give a higher efficiency. In the present invention, instead of using only one pattern, the controller or modulator is arranged to change the switching scheme adaptively by selecting from various predetermined switching schemes. As discussed, the switching scheme is selected by considering the ratio G of the required cycle mean of the bridge output with respect to the DC-link voltage $V_{dc}$.

Since the output modulation signal of the controller 214 in FIG. 2 is slow varying and the frequency of the AC-side voltage is low compared to the switching frequency, the cycle mean of the voltage applied to the inductor L, before and after switching to another switching scheme, is also slow varying. However, in some applications, the cycle mean variation of the inductor current $i_L$ may be affected by the modulation technique.

Figure 5A:
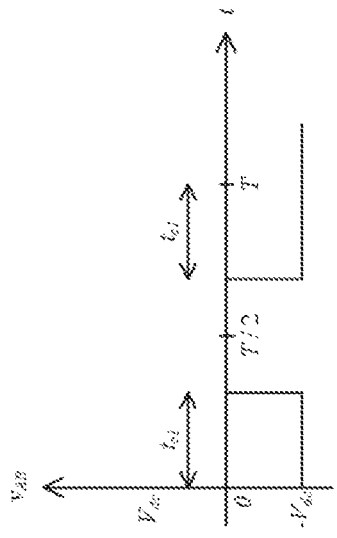
FIG. 5A is a plot showing a switching network output $v_{AB}$ produced by one embodiment of the first switching scheme of FIG. 3A.
Figure 5B:
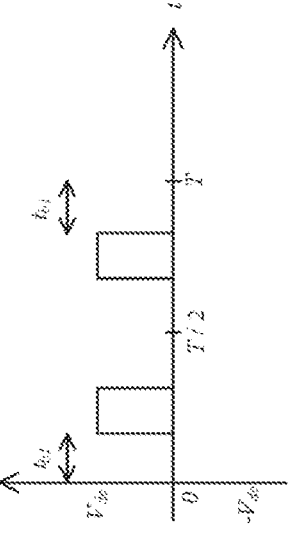
FIG. 5B is a plot showing a switching network output $v_{AB}$ produced by one embodiment of the second switching scheme of FIG. 3B.
Figure 5C:
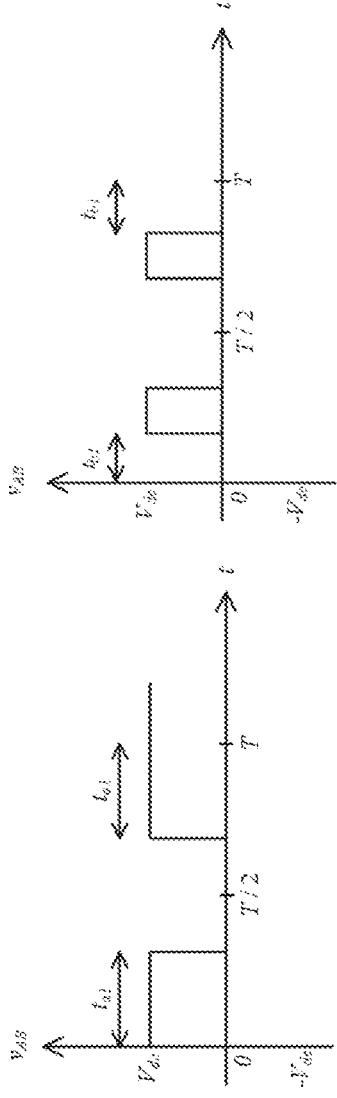
FIG. 5C is a plot showing a switching network output $v_{AB}$ produced by one embodiment of the third switching scheme of FIG. 3C.
Figure 5D:
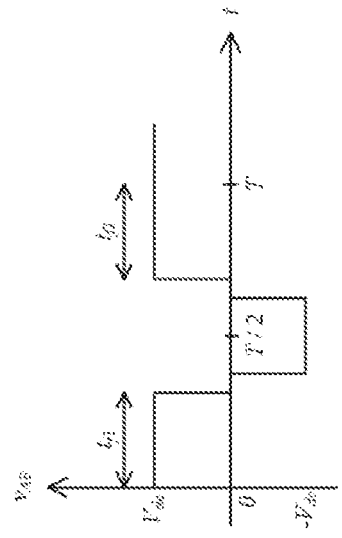
FIG. 5D is a plot showing a switching network output $v_{AB}$ produced by one embodiment of the fourth switching scheme of FIG. 3D.
Figure 5E:
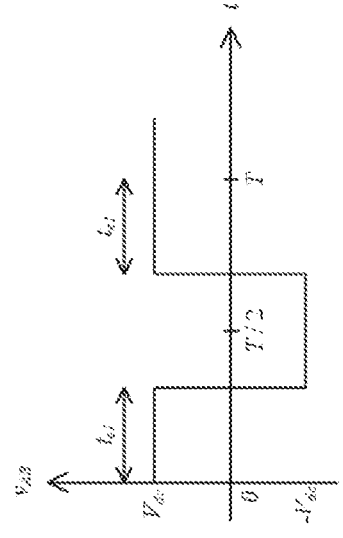
FIG. 5E is a plot showing a switching network output $v_{AB}$ produced by one embodiment of the fifth switching scheme of FIG. 3E.
Figure 5F:
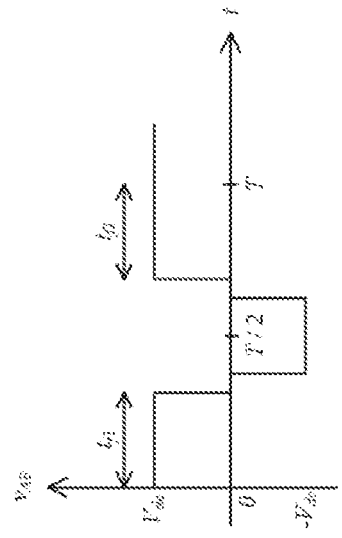
FIG. 5F is a plot showing a switching network output $v_{AB}$ produced by one embodiment of the sixth switching scheme of FIG. 3F.

In order to minimize the cycle mean current variation after switching to another switching scheme, the voltage $v_{AB}$ patterns are preferably made symmetrical about T/2. That is, the output voltage $v_{AB}$ of the switching network is preferably "center-aligned" in one switching period T. FIGS. 5A-5F show the voltage patterns $v_{AB}$ that give the same cycle mean voltage and minimum cycle mean inductor current variation for patterns I-VI of FIGS. 3A-3F, respectively. For example, the pattern in FIG. 5A is the preferred waveform for the pattern in FIG. 3A, that is, the pulse pattern is center-aligned. Both patterns in FIGS. 3A and 5A give the same cycle mean voltage, but FIG. 5A gives the minimum inductor current deviation in a cycle. It should be noted that the PWM switching pulses of the switches need not be "center-aligned" to produce an output voltage $v_{AB}$ that is "center-aligned" in one switching period T.

Experimental Results

To verify the performance of the adaptive schemes, a 1 kW prototype with the schematic shown in FIG. 2 has been built. The root-mean-square (RMS) value of the input voltage and frequency of $v_{ac}$ are 230V and 50 Hz, respectively. The output voltage $v_{dc}$ is 400V. In the experiment, the prototype works as totem-pole power factor corrector (PFC) which provides power factor correction and draw power from the AC power network. The switching frequency of the switches is 45 kHz and the switching actions are determined by the controller and PWM modulator.

Figure 6A:
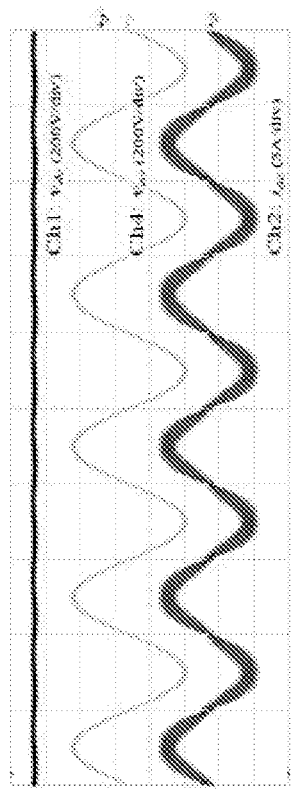
FIG. 6A is a plot showing measured waveforms of $v_{dc}$, $v_{ac}$, and $i_{ac}$ at the full-load condition when tested with a power regulation circuit prototype built according to FIG. 2 using the first and third switching schemes (time base: 10 ms/div)

FIG. 6A is a plot showing measured waveforms of $v_{dc}$, $v_{ac}$, and $i_{ac}$ at the full-load condition when tested with the power regulation circuit prototype built according to FIG. 2 using the first and third switching schemes (time base: 10 ms/div). In the test, pattern I was used for the positive half cycle and pattern III was used for the negative half cycle. It can be observed that when the value of G is very small (i.e., near zero-crossings of the AC-side voltage), pulse dropping appears. It can also be observed that $i_{ac}$ has zero-crossing distortion.

Figure 6B:
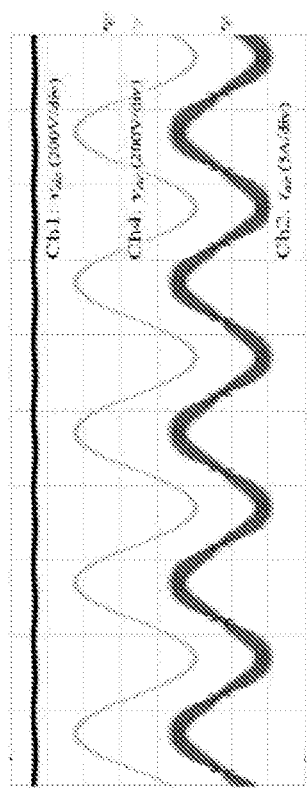
FIG. 6B is a plot showing the measured waveforms of $v_{ac}$, $v_{ac}$, and $i_{ac}$ at the full-load condition when tested with a power regulation circuit prototype built according to FIG. 2 using the first and third switching schemes as well as the fifth switching scheme during zero-crossing (time base: 10 ms/div)

FIG. 6B is a plot showing the measured waveforms of $v_{dc}$, $v_{ac}$, and $i_{ac}$ at the full-load condition when tested with the power regulation circuit prototype built according to FIG. 2 using the first and third switching schemes as well as the fifth switching scheme during zero-crossing (time base: 10 ms/div). In this test, pattern V is introduced during the zero-crossings, while patterns I and III are used for the remaining positive and negative half cycles. It can be seen that the zero-crossing distortion is reduced compared with FIG. 6A.

Figure 6C:
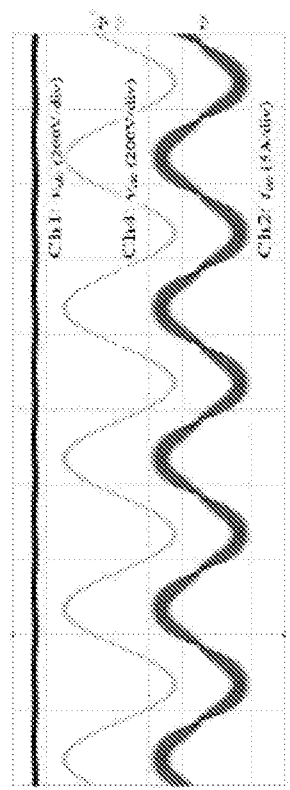
FIG. 6C is a plot showing the measured waveforms of $v_{ac}$, $v_{ac}$, and $i_{ac}$ at the full-load condition when tested with a power regulation circuit prototype built according to FIG. 2 using the first and third switching schemes as well as the second and fourth switching schemes during zero-crossing (time base: 10 ms/div)

FIG. 6C is a plot showing the measured waveforms of $v_{dc}$, $v_{ac}$, and $i_{ac}$ at the full-load condition when tested with the power regulation circuit prototype built according to FIG. 2 using the first and third switching schemes as well as the second and fourth switching schemes during zero-crossing (time base: 10 ms/div). In this test, patterns II and IV are introduced during the zero-crossings, while patterns I and III are used for the remaining positive and negative half cycles. It can be seen that the zero-crossing distortion is further reduced compared with FIGS. 6A and 6B.

Figure 7:
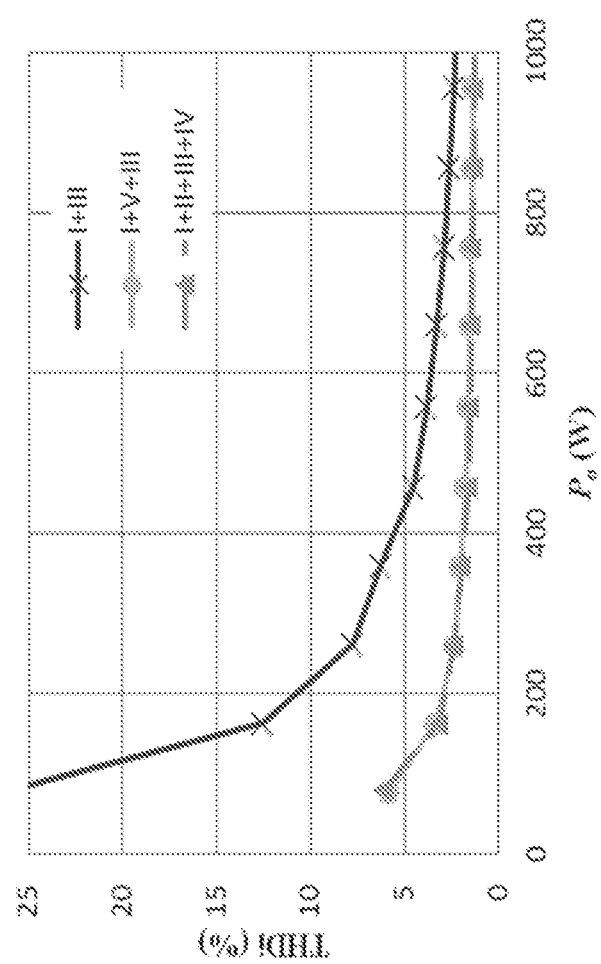
FIG. 7 is a graph showing current total harmonic distortion versus output power for the three measurements in FIGS. 6A-6C.

FIG. 7 shows a comparison of the current total harmonic distortion (THDi) versus output power for the tests of FIGS. 6A-6C. As shown, there is a significant reduction of the THDi for the arrangement in FIGS. 6B and 6C.

Figure 8A:
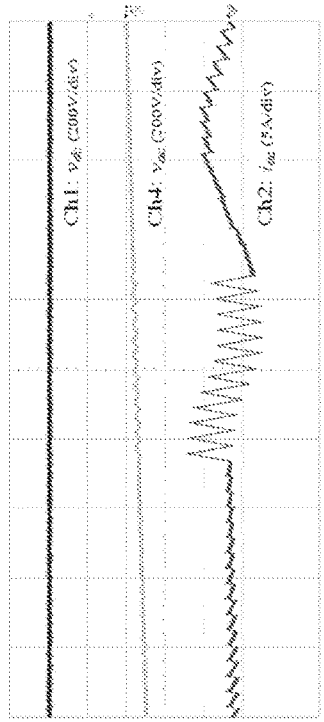
FIG. 8A is a plot showing a switching network output $v_{AB}$ obtained using the first, third, and fifth switching schemes, where the pulses are aligned at the beginning of each switching period T ("left-aligned")
Figure 8B:
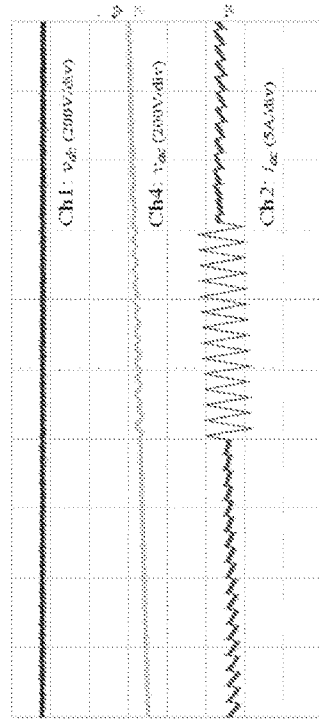
FIG. 8B is a plot showing a switching network output $v_{AB}$ obtained using the first, third, and fifth switching schemes, where the pulses are aligned at T/2 of each switching period T ("center-aligned")
Figure 8C:
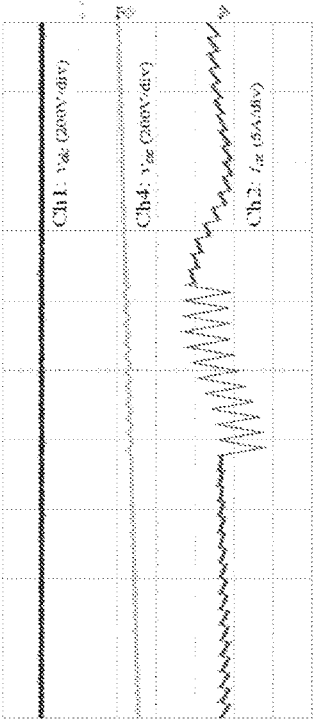
FIG. 8C is a plot showing a switching network output $v_{AB}$ obtained using the first, third, and fifth switching schemes, where the pulses are aligned at the end of each switching period T ("right-aligned")
Figure 9A:
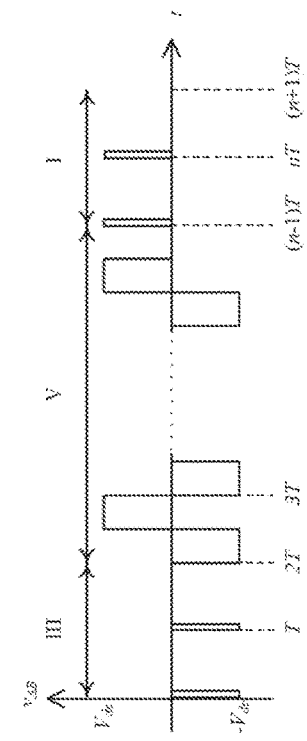
FIG. 9A is a plot showing the measured waveforms of the measured waveforms of $v_{dc}$, $v_{ac}$, and $i_{ac}$ for the "left-aligned" scheme in FIG. 8A.
Figure 9B:
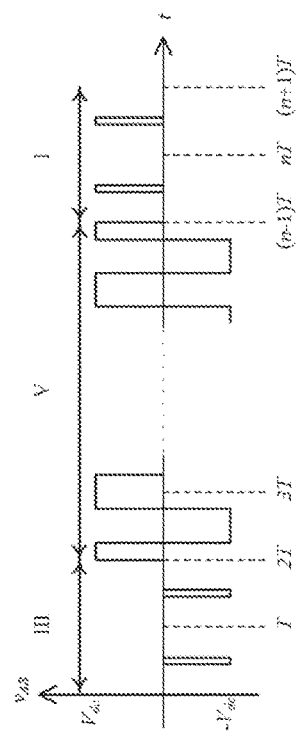
FIG. 9B is a plot showing the measured waveforms of the measured waveforms of $v_{dc}$, $v_{ac}$, and $i_{ac}$ for the "center-aligned" scheme in FIG. 8B.
Figure 9C:
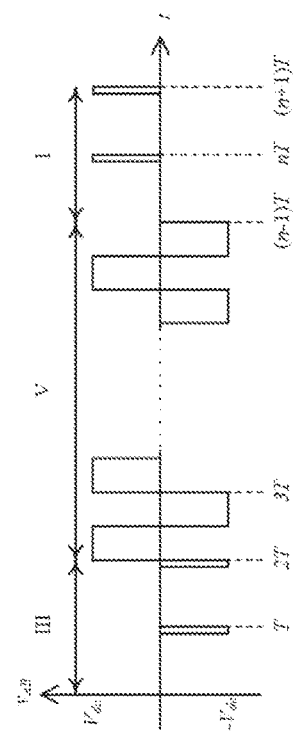
FIG. 9C is a plot showing the measured waveforms of the measured waveforms of $v_{dc}$, $v_{ac}$, and $i_{ac}$ for the "right-aligned" scheme in FIG. 8C.

FIGS. 8A-8C show the network output $v_{AB}$ obtained using the first, third, and fifth switching schemes, where the pulses are aligned differently. More specifically, FIG. 8A shows the voltage pattern of $v_{AB}$ with the pulses aligned at the beginning of switching cycles (that is "left-aligned"); and FIG. 9A shows the corresponding measured waveforms of $v_{dc}$, $v_{ac}$, and $i_{ac}$. FIG. 8B shows the voltage pattern of $v_{AB}$ with the pulses center-aligned in every switching cycle (that is "center-aligned"); and FIG. 9B shows the corresponding measured waveforms of $v_{dc}$, $v_{ac}$, and $i_{ac}$. FIG. 8C shows the voltage pattern of $v_{AB}$ with the pulses aligned at the end of switching cycles (that is "left-aligned"); and FIG. 9C shows the corresponding measured waveforms of $v_{dc}$, $v_{ac}$, and $i_{ac}$. It is clear that the symmetric and center-aligned arrangement gives improved performance.

Figure 10:
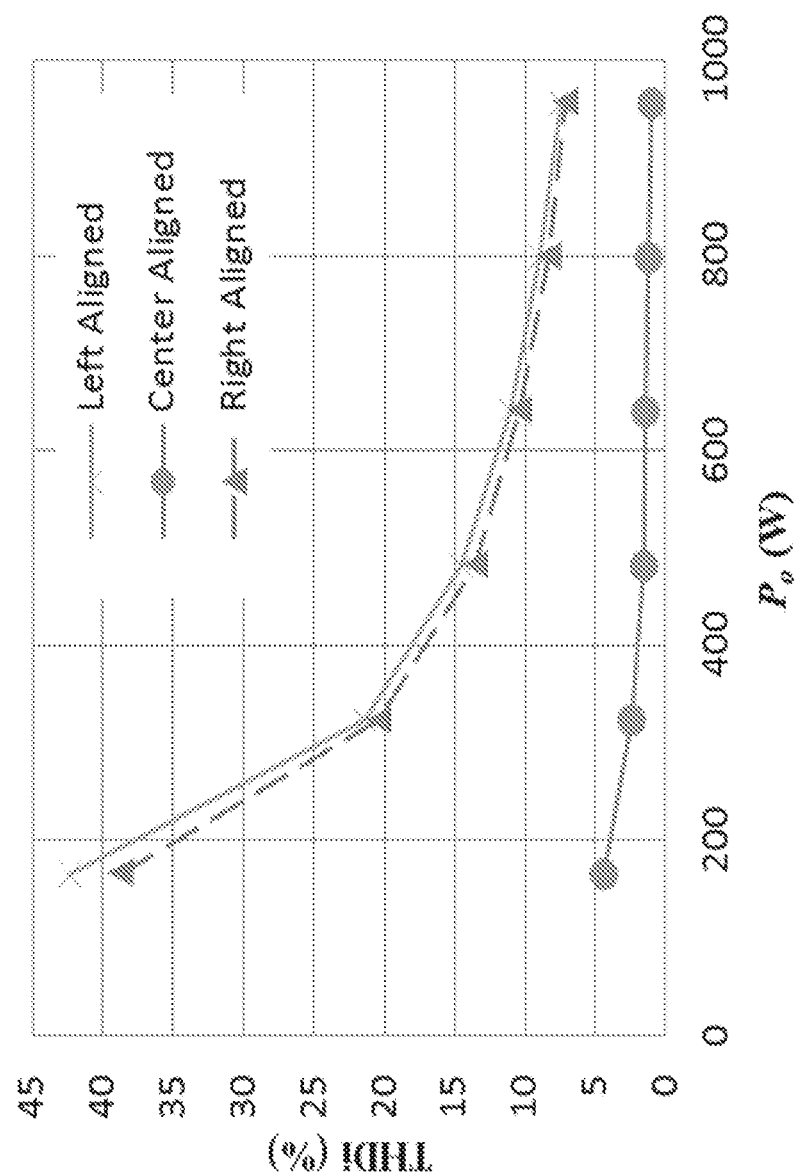
FIG. 10 is a graph showing current total harmonic distortion versus output power for the three measurements in FIGS. 9A-9C.

FIG. 10 shows a comparison of the current total harmonic distortion (THDi) of $i_{ac}$ versus output power for the tests of FIGS. 8A-8C. It can once again be observed that the center-aligned pulses give improved performance.

The embodiments of the power regulation system and method are advantageous in that different switching schemes each with their operational merits and limitations are provided for dynamic adjustment of the switching scheme. In particular, the PWM scheme is dynamically switched to an appropriate one, so that the performance of the entire system is maximized. In preferred embodiments, the pulses generated by the controller or modulator of the invention are center-aligned, thereby effectively minimizing changes in the circuit dynamics during the scheme switching.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein. The controller in the above embodiment may be implemented using a control circuit, a logic circuit, a microcontroller, a controller, a MCU, a CPU, etc., or any combination thereof.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for controlling a switching network of a power regulation circuit, wherein the switching network comprises a first pair of switches and a second pair of switches arranged in parallel with each other, and the switching network has a power output related to a voltage across a first node between the first pair of switches and a second node between the second pair of switches, the system comprising:
one or more controllers arranged to:
receive first signals indicative of power characteristics of an AC power circuit connected with the power regulation circuit and second signals indicative of power characteristics of a DC power circuit connected with the power regulation circuit, the first signals comprising a first current signal indicative of a current in the AC power circuit and a first voltage signal indicative of a voltage across the AC power circuit, and the second signals comprising a second current signal indicative of a current in the DC power circuit and a second voltage signal indicative of a voltage across the DC power circuit;

determine, based on the first and second signals received and a reference current signal indicative of a reference current for the AC power circuit, a required power output of the switching network for regulating power transfer between the AC power circuit and the DC power circuit, wherein the required power output of the switching network is determined based on a ratio G defined by a required per-switching-period-mean voltage across the first and second nodes to a voltage across the DC power circuit, where $-1 \leq G \leq 1$, and the determination includes comparing the first current signal indicative of the current in the AC power circuit with the reference current signal;

select, dynamically, a switching scheme from a plurality of predetermined switching schemes based on the ratio G, wherein each of the predetermined switching schemes represents a unique switching scheme having a unique switching pattern for the first and second pairs of switches per switching period T for controlling switching of the first and second pairs of switches, and wherein for each of the respective predetermined switching schemes, the duty cycles of the first and second pairs of switches are changeable; and generate, based on the dynamically selected switching scheme, output signals for controlling switching of respective switches of the switching network to regulate the voltage across the first and second nodes so as to regulate power transfer between the AC power circuit and the DC power circuit.

2. The system of claim 1, wherein the plurality of predetermined switching schemes comprises two or more of the following: a first switching scheme arranged to control the first and second pairs of switches such that the power output of the switching network is a first voltage value during 0 to ta1 and ta2, to T for each switching period T, where ta1 and ta2 represent time instances in the switching period T, and $0<ta1<ta2<T$; a second switching scheme arranged to control the first and second pairs of switches such that the power output of the switching network is the first voltage value during tb1 to tb2 and tb3 to tb4 for each switching period T, where tb1, tb2, tb3, and tb4 represent time instances in the switching period T, and $0<tb1<tb2<tb3<tb4<T$; a third switching scheme arranged to control the first and second pairs of switches such that the power output of the switching network is a second voltage value during 0 to tc1 and tc2 to T for each switching period T, where tc1 and tc2 represent time instances in the switching period, and $0<tc1<tc2<T$, and the second voltage value is an additive inverse of the first voltage value; a fourth switching scheme arranged to control the first and second pairs of switches such that the power output of the switching network is the second voltage value during td1 to td2 and td3 to td4 for each switching period T, where td1, td2, td3, and td4 represent time instances in the switching period T, and $0<td1<td2<td3<td4<T$; a fifth switching scheme arranged to control the first and second pairs of switches such that the power output of the switching network is the first voltage value during 0 to te1 and te2 to T and the second voltage value during te1 to te2 for each switching period T, where te1 and te2 represent time instances in the switching period T, and $0<te1<te2<T$; and a sixth switching scheme arranged to control the first and second pairs of switches such that the power output of the switching network is the first voltage value during 0 to tf1 and tf4 to T and the second voltage value during tf2 to tf3 for each switching period T, where tf1, tf2, tf3, tf4 represent time instances in the switching period T, and $0<tf1<tf2<tf3<tf4<T$; wherein all of the predetermined switching schemes have the same switching period T.

3. The system of claim 2, wherein the power output of the switching network is symmetric about T/2 for each switching period T, for all predetermined switching schemes.

4. The system of claim 2, wherein the plurality of predetermined switching schemes comprises:
the first switching scheme, the third switching scheme, and one of:
the second and fourth switching schemes;
the fifth switching scheme; and
the sixth switching scheme.

5. The system of claim 4, wherein the one or more controllers are arranged to
select the first switching scheme when it is determined that $\frac{1}{3}<G\leq 1$;
select the third switching scheme when it is determined that $-1\leq G<-\frac{1}{3}$;
select one of the following:
the second switching scheme when it is determined that $0\leq G<\frac{1}{3}$ and the fourth switching scheme when it is determined that $-\frac{1}{3}<G\leq 0$;
the fifth switching scheme when it is determined that $-\frac{1}{3}\leq G\leq\frac{1}{3}$; and
the sixth switching scheme when it is determined that $-\frac{1}{3}\leq G\leq\frac{1}{3}$.

6. The system of claim 2, wherein all of the predetermined switching schemes have the same maximum switching frequency for the first and second pairs of switches.

7. The system of claim 2, wherein each of the predetermined switching schemes requires at most two switching actions for each respective switch in one switching period T.

8. The system of claim 1, further comprising one or more storage, operably coupled with the one or more controllers, for storing the plurality of predetermined switching schemes.

9. The system of claim 1, wherein the one or more controllers is further arranged to generate one or more reference signals.

10. The system of claim 1, wherein the one or more controllers is further arranged to receive one or more reference signals.

11. The system of claim 1, wherein the first and second pairs of switches comprise semiconductor switches.

12. The system of claim 1, wherein the one or more controllers comprises a controller and a PWM modulator.

13. The system of claim 1, wherein the power regulation circuit is arranged to regulate bi-directional power transfer between the AC power circuit and the DC power circuit.

14. A power regulation circuit for regulating power transfer between a AC power circuit and a DC power circuit, comprising: a switching network comprises a first pair of switches and a second pair of switches arranged in parallel with each other, arranged between the AC and DC power circuits, and the switching network has a power output related to a voltage across a first node between the first pair of switches and a second node between the second pair of switches; one or more controllers arranged to: receive first signals indicative of power characteristics of the AC power circuit connected with the power regulation circuit and second signals indicative of power characteristics of the DC power circuit connected with the power regulation circuit, the first signals comprising a first current signal indicative of a current in the AC power circuit and a first voltage signal indicative of a voltage across the AC power circuit, and the second signals comprising a second current signal indicative of a current in the DC power circuit and a second voltage signal indicative of a voltage across the DC power circuit;

determine, based on the first and second signals received and a reference current signal indicative of a reference current for the AC power circuit, a required power output of the switching network for regulating power transfer between the AC power circuit and the DC power circuit, wherein the required power output of the switching network is determined based on a ratio C defined by a required per-switching-period-mean voltage across the first and second nodes to a voltage across the DC power circuit, where $-1 \leq G \leq 1$, the determination includes comparing the first current signal indicative of the current in the AC power circuit with the reference current signal; select, dynamically, a switching scheme from a plurality of predetermined switching schemes based on the ratio C, wherein each of the predetermined switching schemes representing a unique switching scheme having a unique switching pattern for the first and second pairs of switches per switching period T for controlling switching of the first and second pairs of switches, and wherein for each of the respective predetermined switching schemes, the duty cycles of the first and second pairs of switches are changeable based on the ratio G; and generate, based on the dynamically selected switching scheme, output signals for controlling switching of respective switches of the switching network to regulate the voltage across the first and second nodes so as to regulate power transfer between the AC power circuit and the DC power circuit.

15. The power regulation circuit of claim 14, further comprising:
one or more storage, operably coupled with the one or more controllers, for storing the plurality of predetermined switching schemes.

16. The power regulation circuit of claim 14, further comprising:
an inductor arranged at an interface between the first node and the AC power circuit; and
a capacitor across the DC power circuit, at an interface between the switching network and the DC power circuit.

17. The power regulation circuit of claim 14, wherein the power regulation circuit is arranged to regulate bi-directional power transfer between the AC and DC power circuits.

18. A method for controlling a switching network of a power regulation circuit, wherein the switching network comprises a first pair of switches and a second pair of switches arranged in parallel with each other, and the switching network has a power output related to a voltage across a first node between the first pair of switches and a second node between the second pair of switches; the method comprising:
receiving first signals indicative of power characteristics of an AC power circuit connected with the power regulation circuit and second signals indicative of power characteristics of a DC power circuit connected with the power regulation circuit, the first signals comprising a first current signal indicative of a current in the AC power circuit and a first voltage signal indicative of a voltage across the AC power circuit, and the second signals comprising a second current signal indicative of a current in the DC power circuit and a second voltage signal indicative of a voltage across the DC power circuit;

determining, based on the first and second signals received and a reference current signal indicative of a reference current for the AC power circuit, a required power output of the switching network for regulating power transfer between the AC power circuit and the DC power circuit, wherein the required power output of the switching network is determined based on a ratio G defined by a required per-switching-period-mean voltage across the first and second nodes to a voltage across the DC power circuit, where $-1 \leq G \leq 1$, and wherein the determination includes comparing the first current signal indicative of the current in the AC power circuit with the reference current signal;

selecting, dynamically, a switching scheme from a plurality of predetermined switching schemes based on the ratio G, wherein each of the predetermined switching schemes represent a unique switching scheme having a unique combination of switching patterns of the first and second pairs of switches per switching period T for controlling switching of the first and second pairs of switches, and wherein for each of the respective predetermined switching schemes the duty cycles of the first and second pairs of switches are changeable based on the ratio G; and generating, based on the dynamically selected switching scheme, output signals for controlling switching of respective switches of the switching network to regulate the voltage across the first and second nodes so as to regulate power transfer between the AC power circuit and the DC power circuit.

19. The system of claim 18, wherein the plurality of predetermined switching schemes comprises two or more of the following: a first switching scheme arranged to control the first and second pairs of switches such that the power output of the switching network is a first voltage value during 0 to ta1 and ta2, to T for each switching period T, where ta1 and ta2 represent time instances in the switching period T, and 0<ta1<ta2<T; a second switching scheme arranged to control the first and second pairs of switches such that the power output of the switching network is the first voltage value during tb1 to tb2 and tb3 to tb4 for each switching period T, where tb1, tb2, tb3, and tb4 represent time instances in the switching period T, and 0<tb1<tb2<tb3<tb4<T; a third switching scheme arranged to control the first and second pairs of switches such that the power output of the switching network is a second voltage value during 0 to tc1 and tc2 to T for each switching period T, where tc1 and tc2 represent time instances in the switching period T, and 0<tc1<tc2<T, and the second voltage value is an additive inverse of the first voltage value; a fourth switching scheme arranged to control the first and second pairs of switches such that the power output of the switching network is the second voltage value during td1 to td2 and td3 to td4 for each switching period T, where td1, td2, td3, and td4 represent time instances in the switching period T, and 0<td1<td2<tl3<td4<T; a fifth switching scheme arranged to control the first and second pairs of switches such that the power output of the switching network is the first voltage value during 0 to te1 and te2 to T and the second voltage value during te1 to te2 for each switching period T, where te1 and te2 represent time instances in the switching period T, and 0<te1<te2<T; and a sixth switching scheme arranged to control the first and second pairs of switches such that the power output of the switching network is the first voltage value during 0 to tf1 and tf4 to T and the second voltage value during tf2 to tf3 for each switching period T, where tf1, tf2, tf3, tf4 represent time instances in the switching period T, and 0<tf1<tf2<tf3<tf4<T; wherein all of the predetermined switching schemes have the same switching period T.

20. The method of claim 19, wherein the power output of the switching network is symmetric about T/2 for each switching period T, for all predetermined switching schemes.

21. The method of claim 19, further comprising:
selecting the first switching scheme when it is determined that $\frac{1}{3}<G\leq 1$;
selecting the third switching scheme when it is determined that $-1\leq G<-\frac{1}{3}$;
selecting one of the following:
the second switching scheme when it is determined that $0\leq G<\frac{1}{3}$ and the fourth switching scheme when it is determined that $-\frac{1}{3}<G\leq 0$;
the fifth switching scheme when it is determined that $-\frac{1}{3}\leq G\leq \frac{1}{3}$; and
the sixth switching scheme when it is determined that $-\frac{1}{3}\leq G\leq \frac{1}{3}$.

\* \* \* \* \*

UNITED STATES PATENT AND TRADEMARK OFFICE
CERTIFICATE OF CORRECTION

PATENT NO. : 11,018,598 B2  
APPLICATION NO. : 15/701635  
DATED : May 25, 2021  
INVENTOR(S) : Shu Hung Chung, Wing To John Fan and Shun Cheung Ryan Yeung Page 1 of 1

It is certified that error appears in the above-identified patent and that said Letters Patent is hereby corrected as shown below:

In the Claims

Claim 2 Column 17, Line 44 should read "0 to ta1 and ta2 to T for each switching period T, where ta1 and"

Claim 14 Column 19, Line 23 should read "switching schemes based on the ratio G, wherein each of the"

Claim 19 Column 20, Line 41 should read "during 0 to ta1 and ta2 to T for each switching period T,"

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*